(12) United States Patent
Hwang

(10) Patent No.: US 7,393,037 B2
(45) Date of Patent: Jul. 1, 2008

(54) CONVENIENT STORAGE SOLUTIONS IN CARGO AREA

(75) Inventor: John Hwang, Columbus, OH (US)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/530,694

(22) Filed: Sep. 11, 2006

(65) Prior Publication Data

US 2008/0061576 A1     Mar. 13, 2008

(51) Int. Cl.
*B60R 27/00*        (2006.01)
(52) U.S. Cl. .................. 296/37.14; 296/37.8; 224/400; 224/544
(58) Field of Classification Search .............. 296/37.8, 296/37.14; 224/281, 282, 400, 544
See application file for complete search history.

(56) References Cited

U.S. PATENT DOCUMENTS

| | | | |
|---|---|---|---|
| 2,094,401 A | 9/1937 | Girl | |
| 2,391,310 A | 12/1945 | Heller | |
| 2,470,314 A | 5/1949 | Lim | |
| 2,576,385 A | 11/1951 | Bigsby | |
| 2,953,287 A | 9/1960 | Werner | |
| 4,969,793 A | 11/1990 | Pawl | |
| 5,301,992 A | 4/1994 | Whitmore | |
| 6,120,075 A * | 9/2000 | Terry | ........................ 296/26.09 |
| 6,263,867 B1 | 7/2001 | Skelton | |
| 6,752,304 B1 * | 6/2004 | Hotary et al. | ................ 224/544 |
| 2007/0065264 A1 * | 3/2007 | Sturt et al. | ................... 414/545 |

* cited by examiner

*Primary Examiner*—Lori L Lyjak
(74) *Attorney, Agent, or Firm*—Rankin, Hill & Clark LLP; Mark E. Duell

(57) ABSTRACT

A vehicle cargo storage system includes a plurality of bins, trays, tracks, and covers. The tray is received within one of the bins and is movable from a normal retracted position into an extended loading/unloading position so as to place the tray in a more convenient location for access by the user. The tracks and associated slide arms connect the bin to the tray and guide the tray for movement between the extended and retracted positions.

8 Claims, 2 Drawing Sheets

CONVENIENT STORAGE SOLUTIONS IN CARGO AREA

BACKGROUND OF THE INVENTION

1. Field of the Invention

The present invention is directed toward a device for the storage of cargo in vehicles.

2. Description of Related Art

In modern vehicles, it is common to have a storage area so that occupants of the vehicle have a location to place cargo for safekeeping. The storage area may be located in the same interior compartment as the occupants or the storage area may be remote and require that the occupants exit the vehicle to access the area.

Even further, the storage area may be above or below the floor level surface of the vehicle. When the storage area is below the floor level in a bin, a less cluttered appearance results and the cargo is somewhat secured from shifting in the interior compartment during vehicle movement. Furthermore, sub floor level bin storage areas make the most of available space in a vehicle and allow the occupant to transport a maximum amount of cargo.

Unfortunately, because these bins are below floor level, the bins frequently require uncomfortable reaching and extension by the occupant whenever access to the cargo is desired.

Therefore, there exists a need in the art for an apparatus and method that allows a user to easily and quickly access cargo from a sub-floor storage bin.

SUMMARY OF THE INVENTION

The present invention is directed toward an apparatus and method that allows a user to easily and quickly access cargo from a sub-floor storage bin. The present invention is directed toward an apparatus and method to permit an occupant of a vehicle to easily access a tray that is normally located in a bin below the floor level of the vehicle.

More specifically, the present invention includes a tray for carrying cargo. The tray is movable from a retracted, storage position to an extended, loading/unloading position for more convenient access by the user.

BRIEF DESCRIPTION OF THE DRAWINGS

These and further features of the invention will be apparent with reference to the following description and drawings, wherein.

DETAILED DESCRIPTION OF THE PREFERRED EMBODIMENTS

Figure 1:
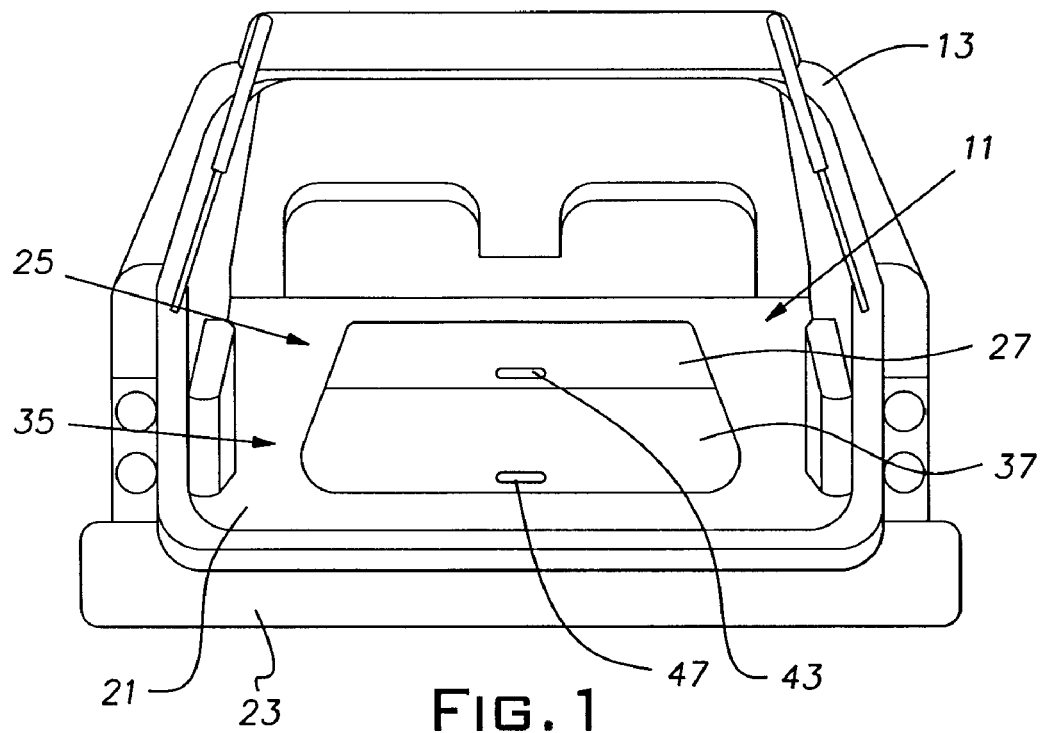
FIG. 1 is a perspective view of a vehicle incorporating a cargo storage system according to the present invention.
Figure 2:
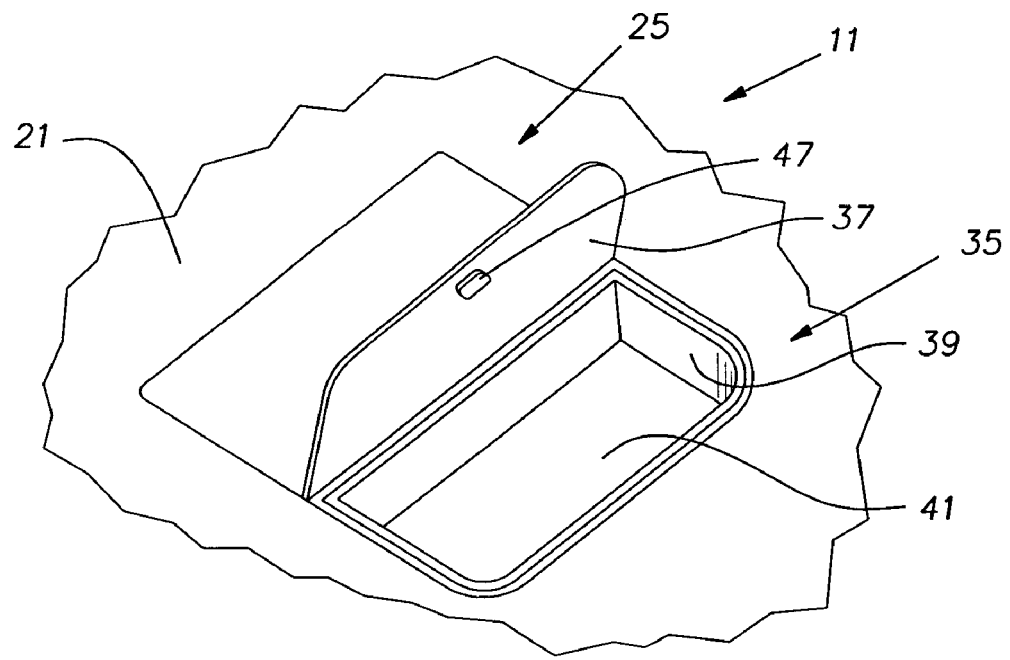
FIG. 2 is a perspective view of the cargo storage system according to the present invention with the second cover open.
Figure 4:
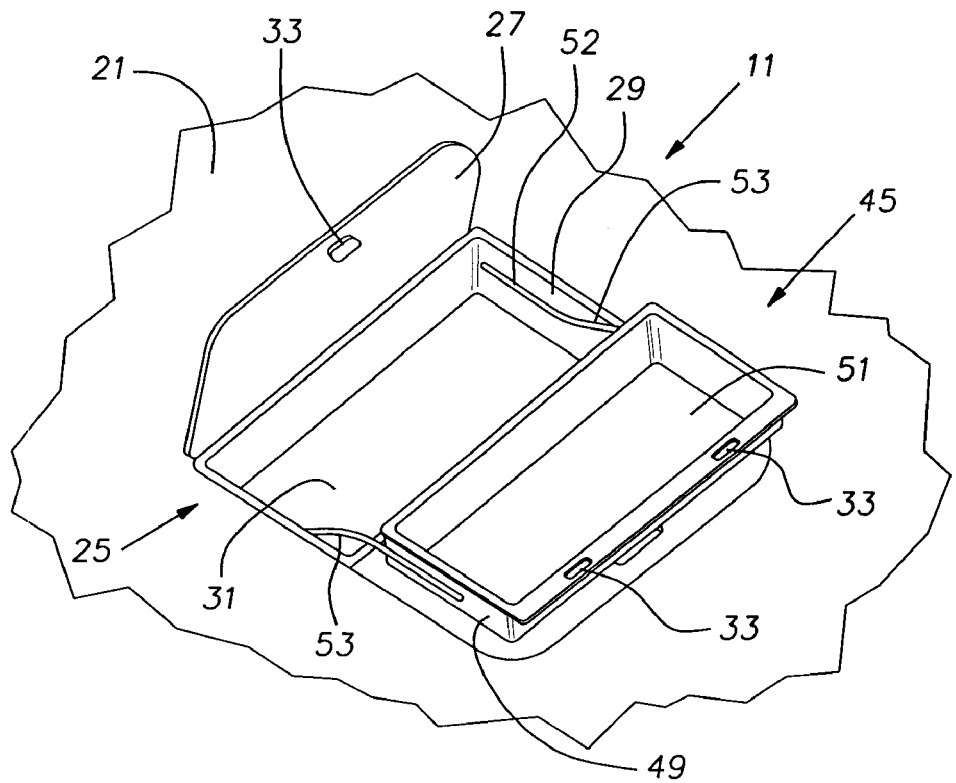

With reference to FIGS. 1, 2, and 4, a cargo storage system 11 according to the present invention is shown. The cargo storage system 11 is disposed within a floor 21 at a rear of the vehicle, so as to be generally between a rear seat and a rear bumper 23 of the vehicle 13. The cargo storage system 11 includes a movable tray 45 that is received in a first fixed bin 25, a second fixed bin 35, and first and second covers 27, 37 for the first and second bins 25, 35, respectively. The second bin 35 is disposed more rearwardly than the first bin 25, as will be appreciated from the following discussion.

The first and second covers 27, 37 are generally rectangular in shape and are received within an upper opening of the associated bins 25, 35, and rest upon a horizontally extending peripheral ledge provided adjacent the upper end of the bins, as illustrated. Each of the covers 27, 37 function independent of the other and provides a smooth surface for proper fitment over the bins 25, 35 so as to be generally flush with the surface of the floor 21. Thus, when the covers 27, 37 are closed, they are at the same elevation as the floor 21 and therefore maximize the cargo area above the floor 21 and simplify the loading of cargo into onto and over the floor 21. Furthermore, the covers 27, 37 assist in containing any cargo that is placed inside of the cargo storage system 11.

Preferably, a forward or first end of each cover 27, 37 is pivotally secured to the associated bin 25, 35, whereas the rearward or second end of each cover 27, 37 is positively yet releasably latched to the associated bin 25, 35. To this end, latch 43 is disposed on first cover 27 while latch 47 is disposed on second cover 37. Latches 43, 47, which are of a common construction and well known in the art, positively secure the covers 27, 37 to the bins 25, 35 and thereby minimize rattling noises from the covers during operation of the vehicle.

Figure 3:
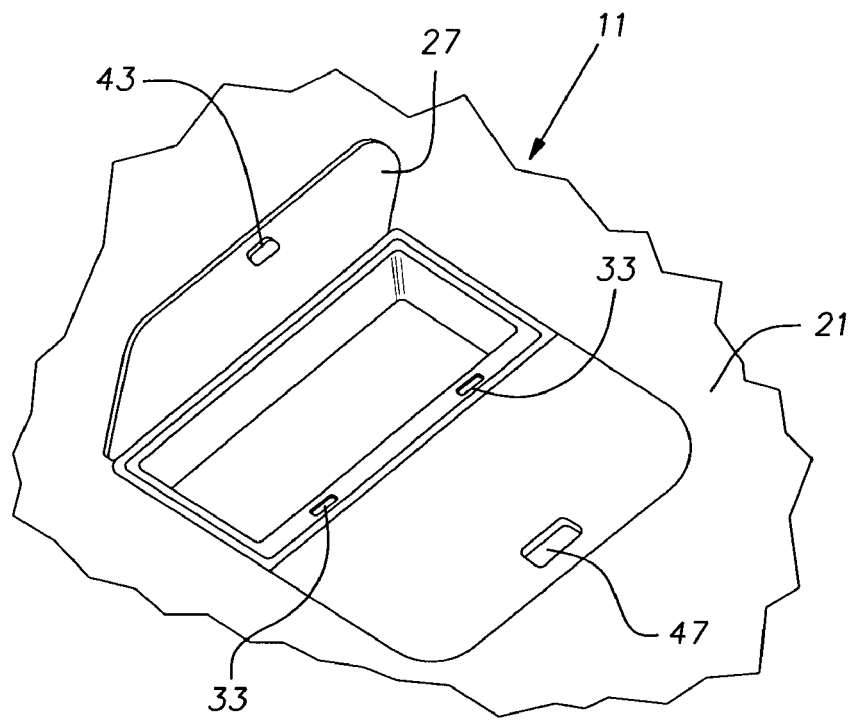
FIG. 3 is a perspective view of the cargo storage system with the first cover open showing a tray disposed therein; and, FIG. 4 is a perspective view of the cargo storage system with the tray extended from an associated first bin.

Referring now to FIGS. 2, 3, and 4, first and second bins 25, 35 and the tray 45 will be hereinafter described. The second bin 35 has side walls 39 that extend downward from an upper peripheral edge and integrally merge into a bottom wall 41. Thus, the side walls 39 and the bottom wall 41 cooperate to define a generally bowl-shaped bin 35 that is useful in containing cargo that is placed in the bin 35. The upper periphery of the second bin 35 defines a ledge that the second cover 37 rests upon, and includes receptacles for hinge pins and the latch of the second cover 37.

As is best shown in FIG. 4, the first bin 25 is similar in construction to the second bin 35 and has side walls 29 that extend downwardly from an upper peripheral edge to a base wall 31. The side walls 29 and base wall 31 cooperate to integrally define the illustrated upwardly open bowl-shaped bin 25. The first bin 25 also provides receptacles for hinge pins and the latch of the first cover 27. It is considered apparent that the first and second bins 25, 35 may be molded from plastic, and may be integrally formed with one another as a unitary structure.

The tray 45 is shaped similarly to the first bin 25, and is designed to fit within the first bin 25. Thus, the tray 45 defines an upwardly open bowl-shaped receptacle for articles that are to be stored therein. The tray 45 has an upper peripheral rim against which cover 27 rests. It should be noted that the tray 45 has handle openings 33 to provide a grasping point for the user to assist in moving the tray 45.

Opposite side walls 29 of the first bin 25 including tracks 52 that receive slide arms extending from the tray 45. The tracks 52 and slide arms 53 cooperate to define a support that permits the tray 45 to move between a storage or retracted position, shown in FIG. 3, and a loading/unloading or extended position, shown in FIG. 4. The tray 45 is lifted and slid forwardly by cooperation of the tracks 52 and slide arms 53, which guide the tray 45 for arcuate motion. Thus, when extended, as shown in FIG. 4, the tray 45 is disposed over, and preferably rests upon, the second cover 37.

Normally, the tray 45 is received in the first bin 25, and the covers 27, 37 are closed to conceal the tray 45 and the second bin 35. It will be appreciated that access to the tray 45 or second bin 35 is attained by first releasing the latch, and then opening the associated cover 27, 37. Should enhanced access to the tray 45 be desired, the second cover 37 is left closed, the first cover 27 is opened, and the tray handle openings 33 are grasped and the tray 45 is pulled and lifted out of the first bin 25 and placed in the extended position illustrated in FIG. 4. After loading or unloading of the tray 45, the tray 45 may be pushed and lowered back into the first bin 25, and the cover 27 placed back in the closed position to conceal the tray 45.

Preferably, the tray 45 moves in an arcuate path from the retracted to the extended positions. As such, the side walls 49 of the tray 45 do not contact the bin side walls, and the bottom wall of the tray passes closely over the second cover 37. Thus, if the tray 45 is loaded, the weight of the tray and cargo will be supported by the second cover 37. Accordingly, the strength of the arms 53 can be relatively reduced as compared to the strength that would be necessary to support the tray 45 in a cantilever fashion.

While the figures illustrate the preferred embodiment in which there is only a tray coupled with the first bin, it is also contemplated that substantially identical second tray could be secured to and received in the second bin. If such a second tray were provided, the second tray would preferably be identical to the tray 45 illustrated and described hereinbefore.

As described hereinabove, the present invention solves many problems associated with previous type devices. However, it will be appreciated that various changes in the details, materials and arrangements of parts, which have been herein described and illustrated in order to explain the nature of the invention, may be made by those skilled in the art without departing from the principle and scope of the invention, as expressed in the appended claims. It is considered apparent that the cooperating tracks and slide arms for guiding motion of the tray during extension and retraction may be provided by alternative structures, either now known or hereafter developed, without departing from the scope and spirit of the present invention. For example, arcuate arms that are pivotally connected to the tray and the first bin side walls may be used in place of the sliding arms/tracks specifically described herein.

What is claimed is:

1. A cargo storage system for a vehicle comprising:
a bin that is received in a floor of the vehicle such that said bin is relatively below a surface of the floor;
a storage tray that is movably mounted to the bin, said tray being movable between a retracted position in which the tray is received within the bin and disposed relatively below the floor surface and an extended position in which the tray is outside of the bin and supported relatively above the floor surface, and
a support that interconnects the bin and the tray and that guides the tray as the tray is moved between the retracted and extended positions.

2. The cargo storage system of claim 1, wherein the bin is a first bin, and further including a second bin located rearward of the first bin and disposed below the floor of the vehicle.

3. The cargo storage system of claim 2, wherein a first cover is movably disposed above the first bin.

4. The cargo storage system of claim 3, wherein a second cover is movably disposed above the second bin.

5. The cargo storage system of claim 4, wherein the first cover is retained in a closed position by a first latch.

6. The cargo storage system of claim 5, wherein the second cover is retained in a closed position by a second latch.

7. The cargo storage system of claim 1, wherein the tray has handle openings to aid in gripping said tray.

8. The cargo storage system of claim 4, wherein when the tray is in the extended position, the tray rests upon the second cover.

\* \* \* \* \*